(12) United States Patent
Wassermann et al.

(10) Patent No.: US 12,085,168 B2
(45) Date of Patent: Sep. 10, 2024

(54) LOCKING ARRANGEMENT WITH AN ELECTRIC MOTOR, LOCKING UNIT AND METHOD FOR OPERATING A LOCKING ARRANGEMENT

(71) Applicant: SVM Schultz Verwaltungs-GmbH & Co. KG, Memmingen (DE)

(72) Inventors: Ralph Wassermann, Holzgünz (DE); Florian Hölzle, Illertissen (DE)

(*) Notice: Subject to any disclaimer, the term of this patent is extended or adjusted under 35 U.S.C. 154(b) by 0 days.

(21) Appl. No.: 18/313,071

(22) Filed: May 5, 2023

(65) Prior Publication Data
US 2023/0358312 A1    Nov. 9, 2023

(30) Foreign Application Priority Data

May 5, 2022  (DE) .......................... 102022111230.6

(51) Int. Cl.
*F16H 63/34*  (2006.01)
*F16H 61/00*  (2006.01)
*B60T 1/00*  (2006.01)

(52) U.S. Cl.
CPC ..... *F16H 63/3483* (2013.01); *F16H 61/0025* (2013.01); *F16H 63/3425* (2013.01); *F16H 63/3475* (2013.01); *B60T 1/005* (2013.01)

(58) Field of Classification Search
CPC .. B60T 1/005; F16H 63/3483; F16H 63/3433; F16H 63/3475; F16H 63/3425; F16H 61/0025; F16D 48/02; F16D 2048/0221; F16D 2048/0248
See application file for complete search history.

(56) References Cited

U.S. PATENT DOCUMENTS 9,321,435 B2 *  4/2016  Landino ............... F16H 63/3483
2013/0008156 A1 *  1/2013  Heubner ............... F15B 11/122
                                                                60/476

(Continued)

FOREIGN PATENT DOCUMENTS

CN       110588610 A      12/2019
DE       102016011148 A1   3/2017
(Continued)

OTHER PUBLICATIONS

Foreign Communication for German Patent Application No. 102022111230.6, German Search Report, 7 pages.

*Primary Examiner* — Lori Wu
(74) *Attorney, Agent, or Firm* — Scheef & Stone, L.L.P.; Keith C. Rawlins

(57) ABSTRACT

A locking arrangement for an electric vehicle, that includes a locking unit, an electric motor, and an axle which is driveable by the electric motor. The locking unit can have a piston and serve for locking the movement of the piston which can be acted on with pressure of a fluid. The locking unit has an electromagnet and at least one detent element, and the detent element interacts with the armature or the armature rod of the electromagnet, and the piston has at least one detent receptacle, and the piston can be secured by the retaining interaction of the detent element with the detent receptacle. The piston can be adjustable between a retracted position and an extended position. The piston can act in at least one of the two positions on the axle in such a manner that the rotation of the axle is mechanically blocked.

13 Claims, 11 Drawing Sheets

(56) References Cited

U.S. PATENT DOCUMENTS

| | | | |
|---|---|---|---|
| 2015/0252897 A1* | 9/2015 | Kristofcsak | F16H 63/3416 |
| | | | 192/219.5 |
| 2018/0172154 A1* | 6/2018 | Nakai | B60T 1/062 |
| 2022/0235862 A1* | 7/2022 | Rolser | F16H 63/3483 |

FOREIGN PATENT DOCUMENTS

| | | | | |
|---|---|---|---|---|
| WO | WO-2007118500 A1 * | 10/2007 | | F15B 1/024 |
| WO | 2022033786 A1 | 2/2022 | | |

* cited by examiner

LOCKING ARRANGEMENT WITH AN ELECTRIC MOTOR, LOCKING UNIT AND METHOD FOR OPERATING A LOCKING ARRANGEMENT

CROSS-REFERENCE TO RELATED APPLICATIONS

This non-provisional application claims the benefit of, and priority to, German Application No. 10 2022 111 230.6, entitled Locking Arrangement with an Electric Motor, Locking Unit and Method for Operating a Locking Arrangement, filed on May 5, 2022, which is incorporated by reference in its entirety.

FIELD OF THE DISCLOSURE

The present disclosure generally relates to a locking arrangement, a locking unit and method for operating a locking arrangement, and more particularly to these aspect in relation to automatic transmissions.

BACKGROUND

Locking units are used, for example, for automatic transmissions of motor vehicles which are locked when parked. Locking units of this type are typically designed in such a manner that, depending on the shift position, the parking lock is or is locked or is not locked in different positions. For this purpose, use can be made, for example, of a piston which can be hydraulically and can be locked electromechanically. A locking unit of this type is disclosed, for example, in the international patent application WO 2013/131926 A1.

However, there may sometimes not even be an automatic transmission in electric vehicles, and therefore the technical installation context of such a locking unit is missing. Since, however, even electric vehicles when parked have to be secured against inadvertent rolling away, diverse approaches are known, for example via hand brakes, worms or spindles in the electric motor itself or mechanical locking by servo motors. Each of these known approaches attempts to be sufficiently secure, but this is associated with considerable disadvantages. They have a multiplicity of plastics parts because of lightweight stipulations. Although these may be light, they have to be of a considerable size to be sufficiently durable during the high forces which occur, and this inevitably requires construction space. Nevertheless, satisfactory robustness cannot be realized, and therefore the disadvantages can be considered to reside in the construction space required, the lack of robustness, and the nevertheless sometimes high weight.

SUMMARY

Disclosed is a locking arrangement for an electric vehicle, including: a locking unit; an electric motor; and an axle which is driveable by the electric motor, wherein the locking unit includes a piston and serves for locking a movement of the piston which can be acted on with pressure of a fluid, wherein the locking unit has an electromagnet and at least one detent element, and the at least one detent element interacts with an armature or an armature rod of the electromagnet, and the piston has at least one detent receptacle, and the piston can be secured by a retaining interaction of the at least one detent element with the at least one detent receptacle, wherein the piston is adjustable between a retracted position and an extended position, wherein the piston acts in at least one of the retracted position and the extended position on the axle in such a manner that a rotation of the axle is mechanically blocked.

Also disclosed is a locking unit for locking a movement of a piston which can be acted on with pressure of a fluid, including: the piston; an electromagnet; at least one detent element; and a nonreturn valve which permits a fluid flow into the locking unit, wherein the at least one detent element interacts with an armature or an armature rod of the electromagnet, and the piston has at least one detent receptacle, and the piston can be secured by a retaining interaction of the at least one detent element with the at least one detent receptacle, wherein the piston is adjustable between a retracted position and an extended position.

Also disclosed is a method for operating a locking arrangement or a locking unit, including: determining that a piston is intended to be adjusted from a retracted position or an extended position into the respective other of the retracted position and the extended position which defines a target position, determining in which operating direction a pump is operated, wherein when a suction mode of the pump is determined, the operating direction of the pump is adjusted into a pressure mode, or when a pressure mode of the pump is determined, the operating direction of the pump is retained in the pressure mode, pressurizing the piston with a hydraulic fluid conveyed by the pump, determining that the piston has reached the target position, when the suction mode is determined, adjusting the pump again into the suction mode.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
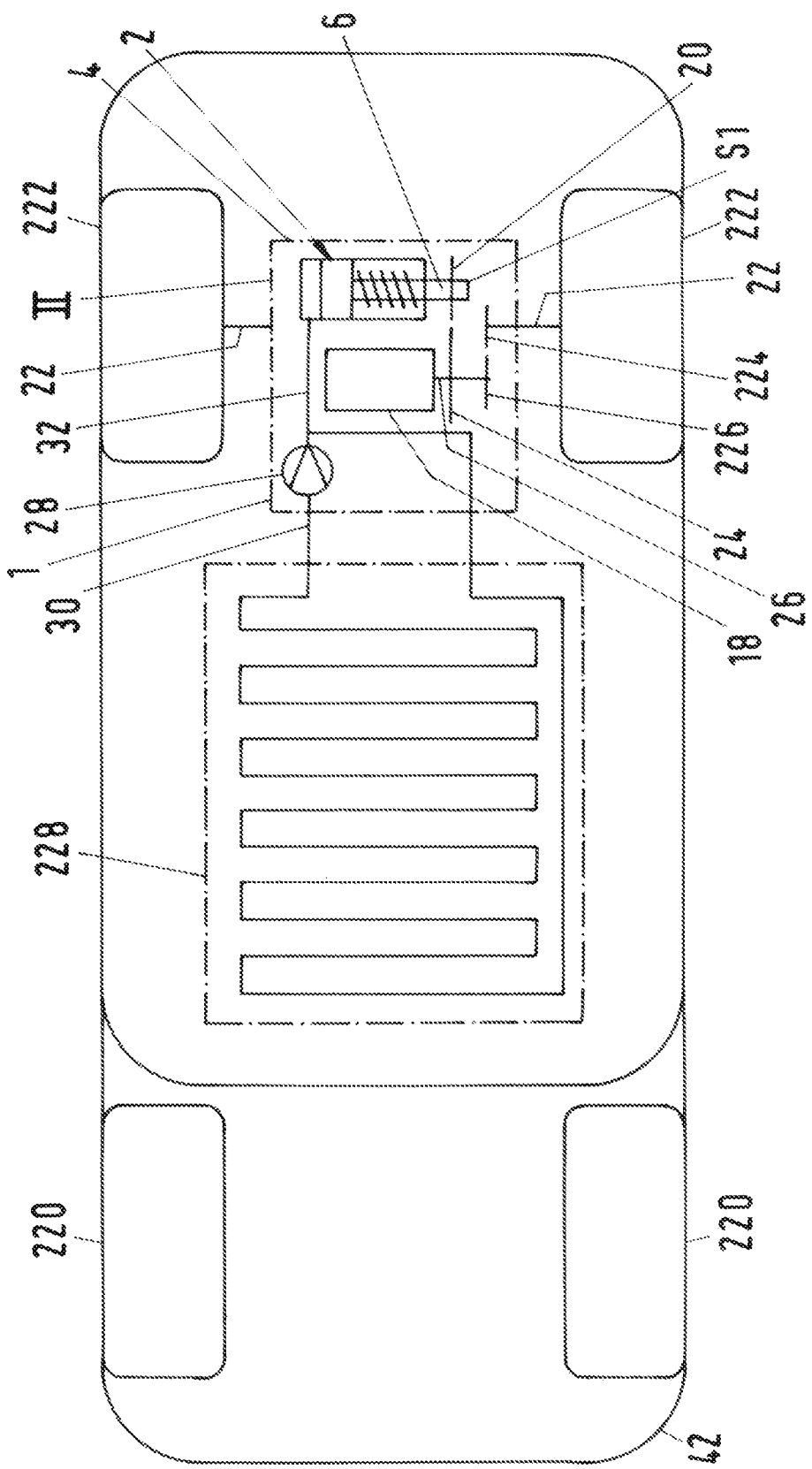
FIG. 1 shows a schematic view of a vehicle with a locking arrangement according to the disclosure.

In aspects, a locking arrangement for an electric vehicle is therefore proposed, comprising a locking unit, an electric motor, and an axle which is driveable by the electric motor, wherein the locking unit comprises a piston and serves for locking the movement of the piston which can be acted on with pressure of a fluid, wherein the locking unit has an electromagnet and at least one detent element, and the detent element interacts with the armature or the armature rod of the electromagnet, and the piston has at least one detent receptacle, and the piston can be secured by the retaining interaction of the detent element with the detent receptacle, wherein the piston is adjustable between a retracted position and an extended position, wherein the piston acts in at least one of its two positions on the axle in such a manner that the rotation thereof is mechanically blocked.

It has been found that, despite the lightweight doctrine for electric vehicles without hydraulic locking units, the use of fluid or hydraulics for a locking unit is a solution which overcomes the problems in the prior art. Satisfactory robustness and high degree of security, a smaller requirement for construction space, and a reduction in weight are achieved. In aspects, the previously electromotively operated locking units (e.g. servomotor with rack transmission/worm transmission) are no longer needed, and at the same time, the disclosed locking aspects have all of the advantages in respect of force and robustness, for example high power density, of the hydraulics.

There is a mechanical chain of action between piston and the axle. This mechanical chain of action can either be present directly (piston engages on/in axle) or can be present indirectly (piston engages in machine element, such as gearwheel, which in turn can engage in a further machine element or is mounted on the axle for conjoint rotation). The piston can block the axle purely mechanically via the mechanical chain of action.

In aspects, the locking arrangement is an assembly, in particular an electric axle, or a system. It can thus be assembled separately in order to be supplied as a completed unit to the final assembly process of an electric vehicle.

The fluid can be a hydraulic oil which can be present in any case in vehicles, for example in a coolant circuit. This fluid can serve for cooling and additionally for the hydraulic work at the piston. The fluid may therefore be used for a different purpose than intended.

The locking arrangement can be understood as meaning a module which can form a unit ready for testing and/or final assembly. This reduces the production complexity. In addition, there is a saving on construction space and weight, which is of high importance specifically in the field of electromobility. In addition, individual interfaces can be reduced, which likewise facilitates final assembly and reduces the degree of complexity.

In aspects, a blocking gear can be included which is connected to a driven shaft of the electric motor or to the axle for conjoint rotation, or which is or can be brought into engagement with a gear which is connected to a driven shaft of the electric motor or to the axle for conjoint rotation, wherein the piston engages in at least one of its two positions in the blocking gear in order to block the rotation of the axle.

The engagement can be a form-fitting engagement since it is secure. The blocking gear, which can be a gearwheel or a belt pulley, is a simple machine element and is therefore suitable for realizing an action of the piston. In addition, such a gear may in any case already be present, and therefore can be simply adapted here without providing further components. The blocking gear can then be part of the mechanical chain of action, for example, a single part of the mechanical chain of action, for saving on weight and reducing the requirement for construction space. However, it is also conceivable for two or more gears, such as gearwheels, to be provided in the mechanical chain of action, for example in order to achieve a favorable arrangement of the locking unit with respect to the electric motor if, for example, an arrangement in the close vicinity is not possible. Alternatively or additionally, shafts and/or axles can participate in the mechanical chain of action. The gear/the gears can be arranged thereon for conjoint rotation.

In aspects, a pump of a coolant circuit and a line between the pump and locking unit can be included. Conventional parking locks are acted on by hydraulic pressure from an automatic transmission. However, electric vehicles possibly do not have an automatic transmission at all. Surprisingly, it has been found that even hydraulic pressure from a coolant circuit of a drive battery can be used to pressurize the piston hydraulically. It has turned out that this is possible without having a significant effect on the main task of the coolant circuit, namely the thermal management for the electric motor, the power electronics and the drive battery, in order to be able to operate the electric vehicle with a high degree of efficiency. The pump, which can be a coolant pump, therefore can be used not only for operating the coolant circuit and circulating the fluid there, but cleverly can also function as a drive for the piston or can act on the latter with hydraulic pressure. The line can be connected to the coolant circuit, as a result of which it can be fed directly with fluid from the coolant circuit. A fluid or a hydraulic fluid can be contained in the coolant circuit.

In aspects, the line can be free from a valve and/or the locking unit can be free from a valve. It is therefore conceivable, in a structurally simplest refinement, that a valve is not arranged in the direct fluid path between the pump and the locking unit or even the piston thereof. The pump pressure or hydraulic pressure achieved by the pump can therefore act directly on the piston in order to adjust the latter. Solenoid valves required previously for the circuitry can therefore be dispensed with. When the locking unit is arranged on the pressure side of the pump or during operation of the pump in such a manner that the locking unit is arranged on the pressure side, the piston of the locking unit can be hydraulically adjusted, for example, extended into an extended position. This greatly reduces the degree of complexity and outlay on control.

In aspects, the locking unit can have a nonreturn valve which permits a fluid flow into the locking unit, or can have a solenoid valve. A solenoid valve can control and/or regulate fluid flows and/or pressure in a known manner. The solenoid valve can serve as a 2/2-way valve—normally open—and for controlling the fluid circuit on the locking unit. Alternatively, a nonreturn valve (e.g., a ball nonreturn valve) can be provided which can be configured as a 3/2-way nonreturn valve. In aspects, fluid is admitted through a fluid inlet into the locking unit, but it does not emerge again through said fluid inlet. This is because the nonreturn valve is then closed. The fluid can leave the locking unit via a separate fluid opening.

In the present context, this nonreturn valve has advantages in the arrangement with the pump. In the pressure mode, the nonreturn valve allows the pressurizing fluid to pass, in order to adjust the piston. However, pumps can also have a suction mode. The nonreturn function is then very useful since it prevents extraction by suction of the locking unit. In addition, the nonreturn valve prevents the pump in the reversing mode or suction mode from conveying fluid "backward" through the locking unit and also air being entrained into the fluid. Furthermore, the nonreturn function prevents frothing of the fluid, which is conceivable if air is sucked through the locking unit.

However, this nonreturn valve also has further advantages in addition to preventing frothing, since the nonreturn valve also serves to increase the efficiency of the entire system.

The present arrangement makes it possible for the pump, irrespective of its actual operating direction (pressure/suction), to act only briefly and explicitly, for adjusting the piston, on the locking unit with hydraulic pressure, with this being able to last less than one second. Such a short period of time has virtually no effect on the main task of the pump. If the pump conveys the fluid in any case with pressure in the direction of the locking unit, this fluid pressure can be used for adjusting the piston. If the main task of the pump actually provides suction, the pump can nevertheless change into the pressure mode for the brief moment in order to convey fluid with pressure in the direction of the locking unit for adjusting the piston. After adjustment of the piston, the pump can resume its direction of rotation as per the main task. The nonreturn valve then closes and separates the locking unit together with its internal leakages (=losses) from the hydraulic system. This leads to great energy efficiency.

In aspects, the nonreturn valve or the solenoid valve can be formed integrally with a housing of the locking unit. In aspects, the valve housing can be formed integrally with the housing of the locking unit, which is advantageously able to be provided as a plastics injection molded part. The housing can also be a plastics injection molded part independently of the valve, for example, for weight reasons. This integration makes it possible to avoid individual parts and a plurality of assembly steps. In the case of the nonreturn valve, for example, a valve closing spring and the closing element, for example the ball, can be inserted into the integrated valve housing and then closed with a valve cover. The valve cover can comprise or form the fluid inlet and can comprise or form a valve seat for the closing element. The cover can therefore likewise integrate a plurality of functions in order to reduce costs and to reduce the number of components.

In aspects, it can have an outer housing in which the locking unit is arranged. This outer housing is a housing which is separate from the housing of the locking unit.

Such an outer housing has not been necessary to date since the locking units have generally been fitted directly into a transmission. The outer housing can be formed from two shells and/or can be a plastics injection molded part, which is cost-effective and permits a great diversity of geometries. A seal can be provided between the two shells. It is conceivable for the outer housing to have bores through which screws for the fastening thereof can reach. It is conceivable for the housing to have bores through which screws for the fastening thereof in the outer housing can reach.

In aspects, the outer housing can exclusively have three openings or interfaces, for example, a fluid opening, an electrical opening and a mechanical opening. A combining of functionalities by the locking unit can considerably reduce the number of openings or interfaces. The outer housing can therefore have a fluid opening through which a fluid feed line and possibly also a fluid drain line leads. The latter may be dispensed with under some circumstances since the locking unit can stand in hydraulic fluid. The single plug of the locking unit can protrude through the one electrical opening. A component can protrude through the mechanical opening into the outer housing and can be connected to the piston for the adjustment thereof. The adjustment movement of the piston to outside the outer housing is provided through the mechanical opening. Such a reduction in interfaces greatly reduces an outlay on adaptation at the location downstream in the value chain. Owing to defined interfaces, new locking units can be integrated in existing arrangements.

In aspects, a locking unit is also proposed, comprising a piston and serving for locking the movement of the piston which can be acted on with pressure of a fluid, wherein the locking unit has an electromagnet and at least one detent element, and the detent element interacts with the armature or the armature rod of the electromagnet, and the piston has at least one detent receptacle, and the piston can be secured by the retaining interaction of the detent element with the detent receptacle, wherein the piston is adjustable between a retracted position and an extended position, wherein the locking unit has a nonreturn valve which permits a fluid flow into the locking unit.

The advantages already described above in relation to the locking arrangement are obtained analogously for the locking unit too, to which reference is hereby made. The refinements described in relation to the locking unit in the context of the locking arrangement apply equally to the locking unit.

In aspects, a method for operating a locking arrangement according to the disclosure or a locking unit according to the disclosure is also proposed, comprising at least the following steps:
  determining that the piston of the locking unit is intended to be adjusted from the retracted position or the extended position into the respective other of the two positions (target position),
  determining in which operating direction the pump of the coolant circuit is operated, wherein
    when a suction mode of the pump is determined, the operating direction of the pump is adjusted into the pressure mode, or
    when a pressure mode of the pump is determined, the operating direction of the pump is retained in the pressure mode,
  pressurizing the piston with a hydraulic fluid conveyed by the pump,
  determining that the piston has reached the target position,
  when the suction mode is determined in b): adjusting the pump again into the suction mode.

The advantages already described above in relation to the locking arrangement are obtained analogously for the method too, to which reference is hereby made. The method is concerned with the cost-efficient and highly effective release of the locking unit such that the vehicle can be moved. The determining in a) can take place, for example, by sensor or by motor control, for example is generated by the fact that an ignition key is turned for starting the vehicle or a start button is pressed. It is conceivable for step c) to be carried out merely for just one second or even less. As a result, a possibly actually differing operating direction of the pump is reversed not for long so as not to adversely affect the main task of the pump. Step e) can be followed by the closing of a fluid inlet of the locking unit, for example by a nonreturn valve or the solenoid valve. The method steps indicated run in the indicated sequence.

In the figures, identical or mutually corresponding elements are denoted in each case by the same reference signs and will therefore not be described anew unless expedient. In order to avoid repetitions, features that have already been described will not be described again, and such features are applicable to all elements with the same or mutually corresponding reference designations unless this is explicitly ruled out. The disclosures in the description as a whole are transferable analogously to identical parts with the same reference signs or the same component designations. It is also the case that the positional indications used in the description, such as for example above/top, below/bottom, lateral, etc., relate to the figure presently being described and illustrated and, in the case of the position being changed, are to be transferred analogously to the new position. Furthermore, it is also possible for individual features or combinations of features from the different exemplary embodiments shown and described to constitute independent or inventive solutions or solutions.

FIG. 1 depicts an electric vehicle 42 with a locking arrangement 1 according to the disclosure. The electric vehicle 42 merely shows the principle and also comprises two front wheels 220 and two rear wheels 222 which are driveable. For this purpose, at least one electric axle 4 is provided per rear wheel 222 or one electric axle for the two rear wheels 222. Front wheel drive or all-wheel drive is alternatively also conceivable. Each of the rear wheels 222 has an axle 22 with a gearwheel 224 arranged thereon for conjoint rotation. The gearwheel 224 is engaged by a gearwheel 226 which is arranged on a shaft 26 of an electric motor 18 for conjoint rotation. The driving force of the electric motor can thus be transmitted to the rear wheel 222 or the rear wheels 222.

A gear 24 or gearwheel is likewise connected to the shaft 26 for conjoint rotation. Said gear 24 is engaged by a blocking gear 20. A piston 6 of a locking unit 2 or a follow-up mechanism can optionally engage in the blocking gear 20 in order to release or to prevent rotation of the blocking gear 20. In the position shown, the piston is shown in its retracted position S1, and a follow-up mechanism engages in a form-fitting manner in the blocking gear 20. A mechanical chain of effect is thus produced starting from the piston 6, specifically: piston 6—blocking gear 20—gear 24—shaft 26—gearwheel 226—gearwheel 224—axle 22—rear wheel 222 or the rear wheels 222. This chain of effect can also be configured differently or with fewer machine elements.

The locking arrangement 1 for the electric vehicle 42 therefore comprises the locking unit 2, the electric motor 18 and at least one axle 22 which can be driven by the electric motor 42. The locking unit 2 has the piston 6. It also serves for locking the movement of the piston 6 which can be acted on with pressure of a fluid. In the retracted position S1 shown, the piston 6 acts on the axle(s) 22 in such a manner that the rotation thereof is mechanically blocked.

The electric vehicle 42 also comprises a drive battery 228 and a coolant circuit 30 with a corresponding line. For circulating the fluid contained in the coolant circuit 30, a pump 28 is provided which has two operating directions or directions of rotation, namely suction and pressure. In addition, a line 32 is provided between pump 28 and locking unit 2 in order to act on the piston 6 with hydraulic pressure. The line 32 is connected to the coolant circuit 30, with fluid being able to be fed from the coolant circuit into the line.

Figure 2:
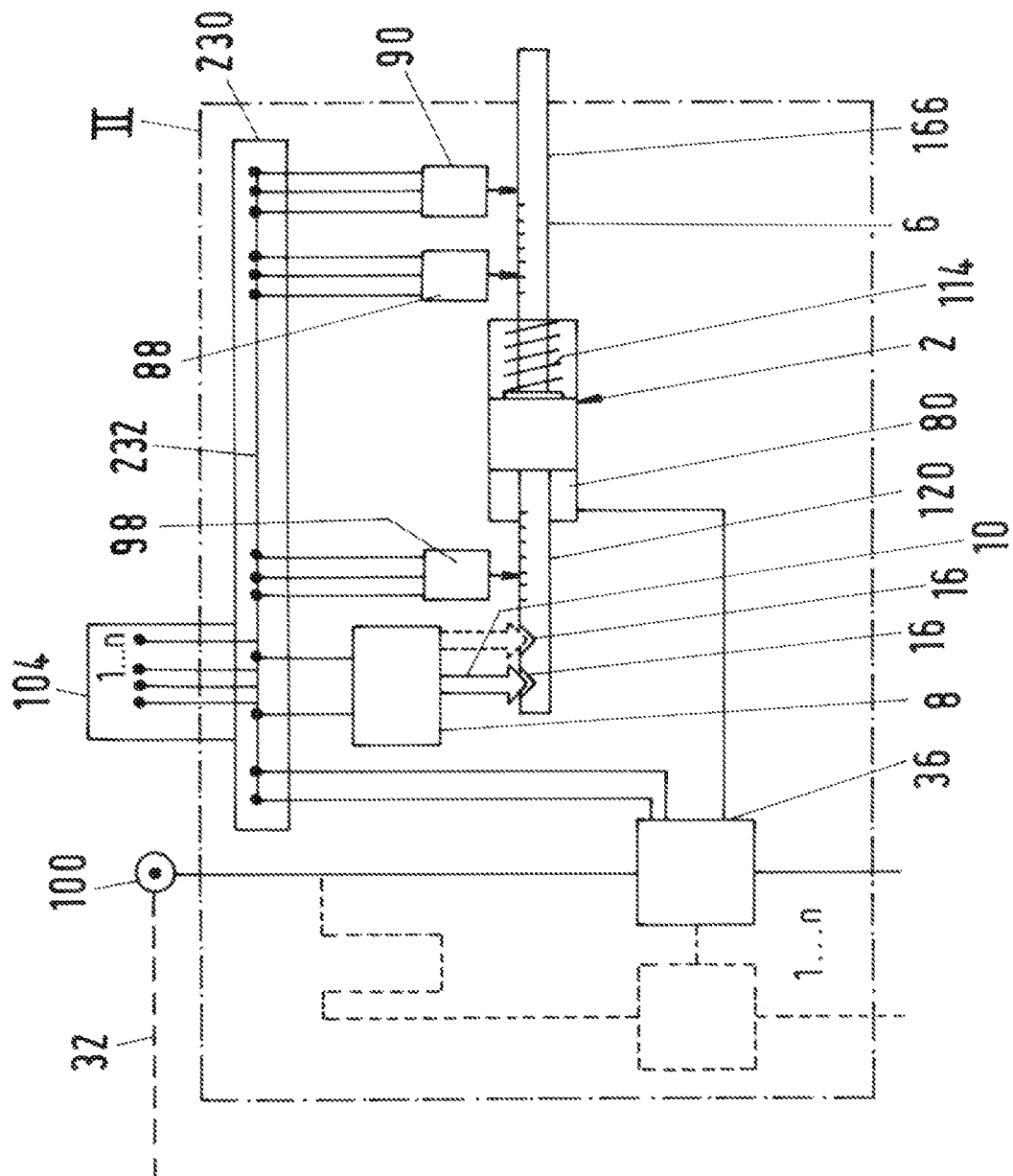
FIG. 2 shows a detail II according to FIG. 1.

FIG. 2 shows a detail II from FIG. 1, the detail II also being of a schematic character. From the detail II from FIG. 1, only the locking unit 2 is illustrated here. A fluid inlet 100 which can be an opening in a housing 40 of the locking unit 2 can be seen. The line 32 leads to the fluid inlet 100. The locking unit 2 from FIG. 2 also comprises a solenoid valve 36, with a nonreturn valve 43 or a plurality of valves also being conceivable. The valves regulate and control at least one fluid inlet and/or fluid outlet of the locking unit 2 for hydraulic pressurization of the piston 6. The fluid runs through the solenoid valve 36 and a pressure line network to a pressure chamber 80 in order to pressurize the piston 6 to the right in the plane of the image and to bring it into the extended position S2. The piston 6 is pressurized by a restoring element, for example a piston spring 114, to the left in the plane of the image, in order to bring it into its retracted position S2. The respective piston position S1, S2 is electromechanically locked, with an electromagnet 8 and a detent unit 120 being used for this purpose. As will be described later in detail, detent elements 10 can be latched in detent receptacles 16, 202, 204 or blocked there, as a result of which a longitudinal movement of the piston 6 is also blocked. The respective position of the detent unit 120 can be sensed by a magnetic field sensor 98. The respective position of the piston 6 or of its piston tube 166 can be sensed by at least one magnetic field sensor 88, with it also being possible for a further magnetic field sensor 90 to be provided for this purpose.

The locking unit 2 deftly comprises an electrical interlinking 230 comprising a BUS system 232. The solenoid valve 36, the electromagnet 8 and the magnetic field sensors 88, 90 and 98 are connected to said BUS system in terms of signaling. In addition, a single plug or an electronic interface 104 is provided. All of the electronic components of the locking unit 2 can thus be supplied in terms of signaling via a single electronic interface 104.

Figure 3:
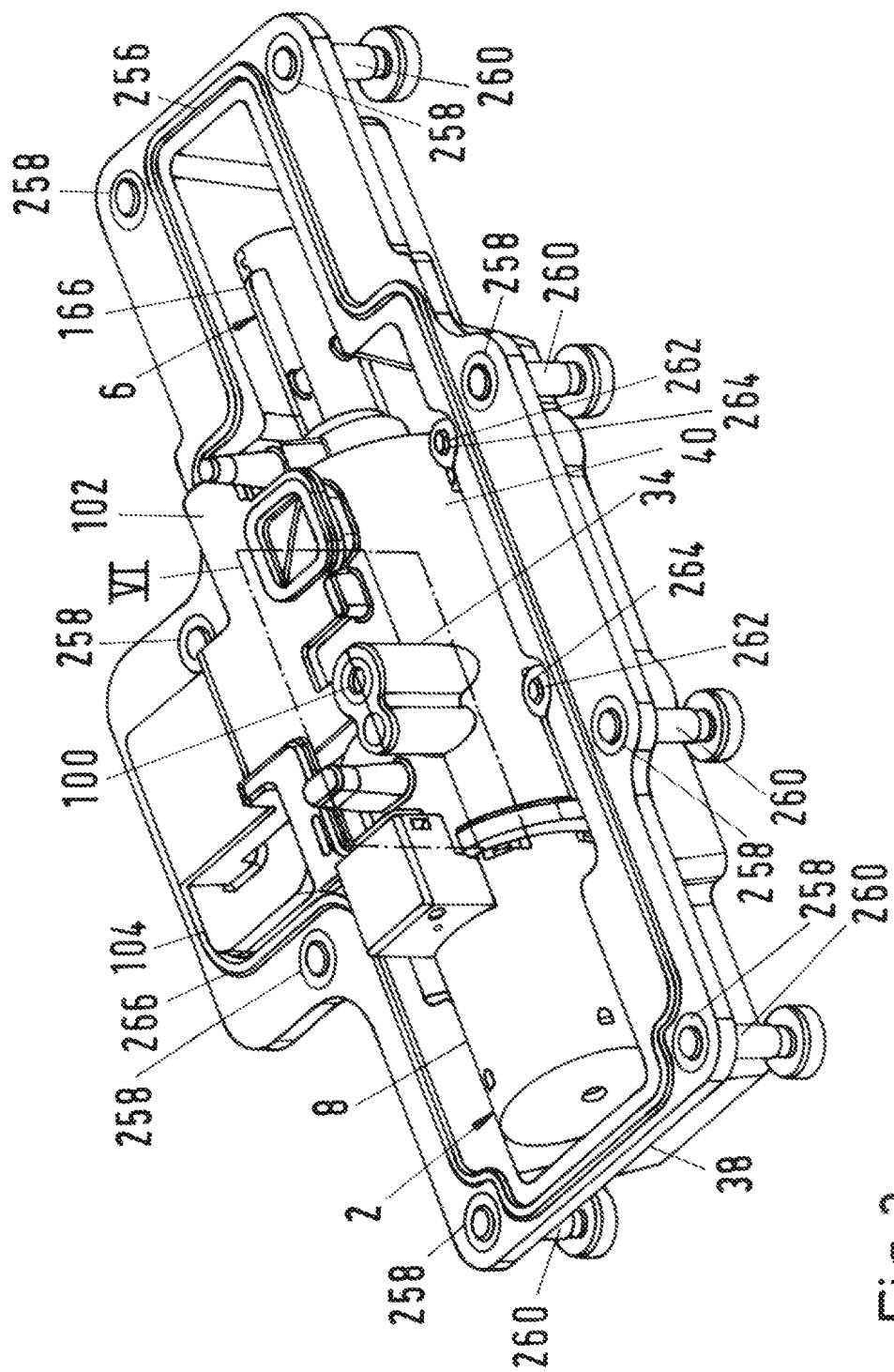
FIG. 3 shows a perspective view of a locking unit.

FIG. 3 shows a perspective view of a locking unit 2. The latter has a longitudinal direction L, a radial direction R and a circumferential direction U. It can be seen that it is arranged in an outer housing 38, of which only one of two shells is illustrated. The shell which is shown has a seal 256. The outer housing 38 has bores 258. Screws 260 reach through them to fasten said outer housing. The housing 40 of the locking unit 2 also has bores 262 through which screws 264 reach for fastening said housing in the outer housing 38. The outer housing 38 comprises merely three openings, namely a fluid opening (not illustrated), an electrical opening 266 and a mechanical opening (not illustrated). The electronic interface 104 protrudes through the electrical opening 266.

FIG. 3 also shows an electrical module housing 102 which is a housing separate from the housing 40 and comprises a leadframe on which at least one magnetic field sensor 88, 90 is arranged and which comprises a BUS system 232. The leadframe is insert molded by the plastic of the electrical module housing 102. The electronic interface 104 is formed by the electrical module housing 102.

Figure 4:
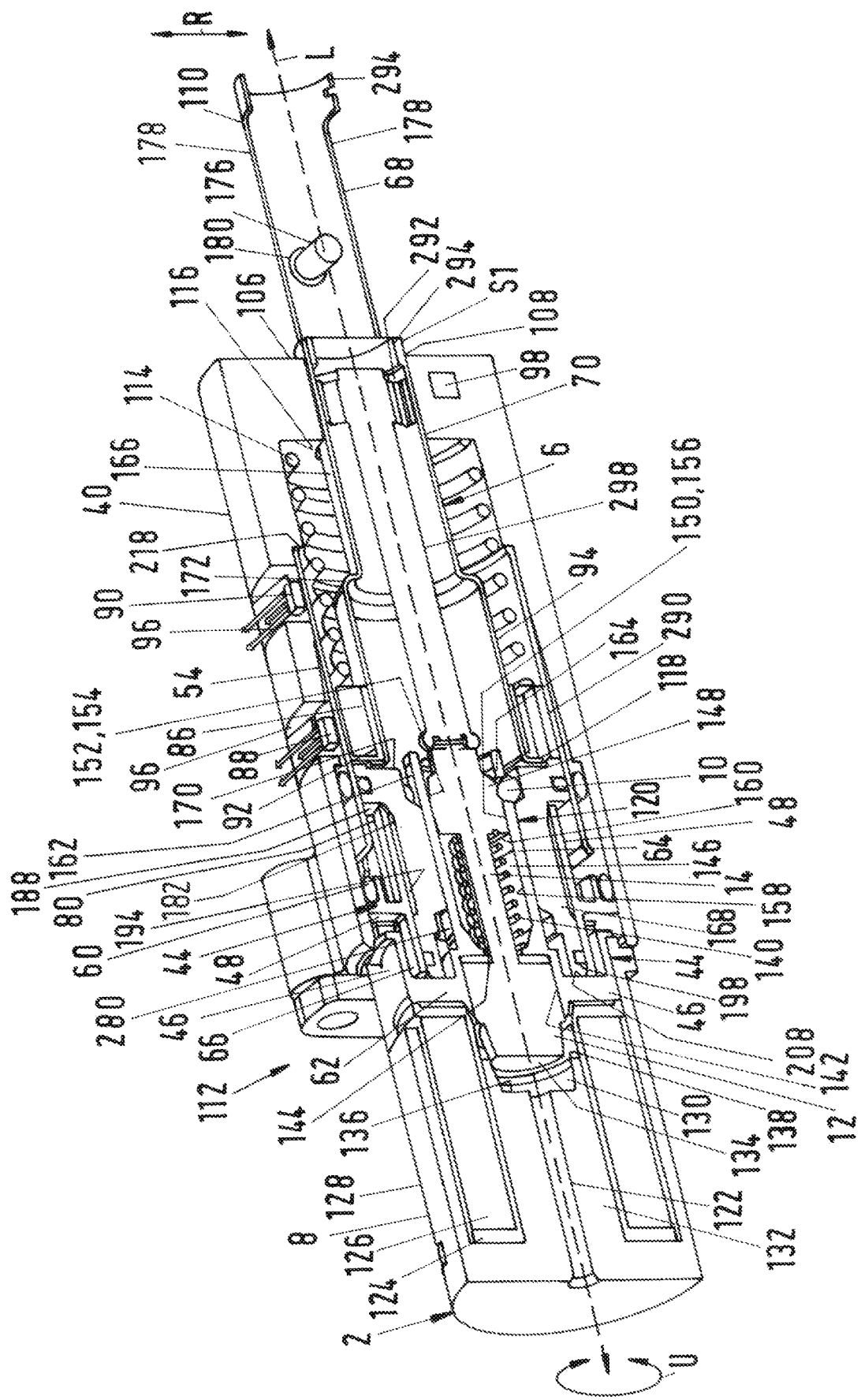
FIG. 4 shows a perspective sectional view through a locking unit in the retracted position.
Figure 5:
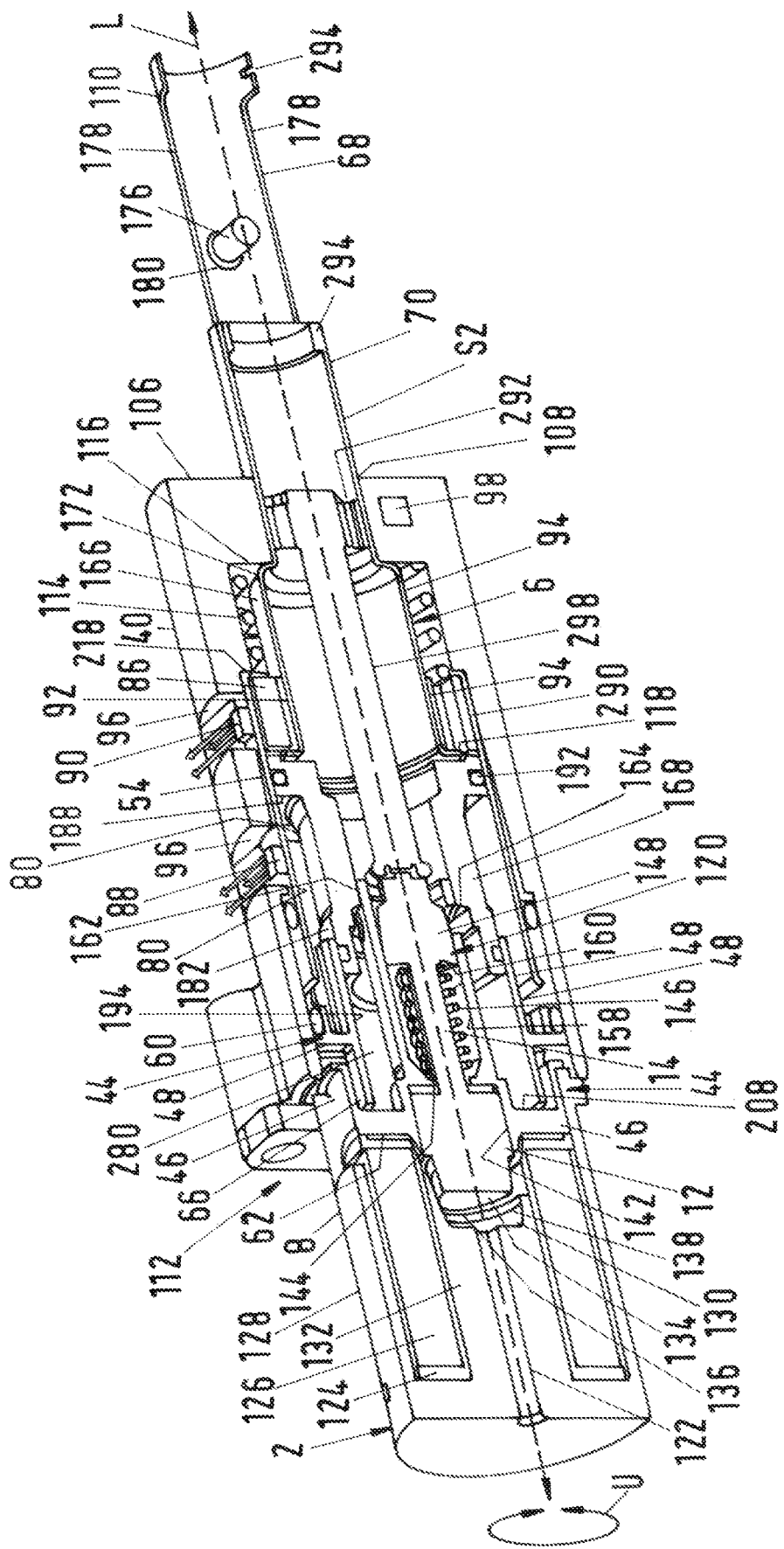
FIG. 5 shows a perspective sectional view through the locking unit of FIG. 4 in the extended position.

The locking unit 2 is described in more detail with regard to FIGS. 4 and 5.

FIG. 4 shows a perspective sectional view through a locking unit 2 in the retracted position S1.

The locking unit 2 has a housing 40, at the front housing end 106 of which there is provided an opening 108 out of which the front end 110 of the piston 6 projects. The piston 6 is designed as a hollow part. At the rear housing end 112 opposite the opening 108, an electromagnet 8 adjoins the housing 40 in the axial direction or longitudinal direction. Axial direction here means either the axis of symmetry or longitudinal axis L or else the direction of movement of the piston 6. In the housing 40, the piston 6 is mounted so as to be movable in the axial direction along its longitudinal axis L. In aspects, the piston 6 is at least partially mounted in a middle piece 44 which is at least partially surrounded by the housing 40, the middle piece 44 being formed in two parts from a metal part 46 and a plastics part 48. Here, a drive is provided for the movement of the piston 6, and in aspects, the piston 6 can be acted on with pressure, such as with hydraulic pressure, the force component of said pressure being directed counter to the direction of force of a piston spring 114. Here, the piston spring 114 is supported at one end on a shoulder 116, which adjoins the housing end 106 at the inside, or on a front face inner wall of the housing 40.

At the other end, the piston spring 114 is supported on a flange ring 118 of the piston 6 or, as shown in this embodiment, on a magnetic element 86 or on a plastics carrier 92. Said flange ring 118 is situated in the interior, centrally in the housing 40.

The piston 6 moves, owing to the pressure, between multiple positions; in the variant shown here, two positions (retracted position S1, extended position S2) are provided by way of example in FIGS. 4 and 5. The situation of the piston 6 in the respective positions is fixable by a detent unit 120 which is equipped with detent elements 10. The electromagnet 8, or the elements thereof, serve(s) for the actuation of the detent unit 120, in particular for the detent elements 10 thereof. The electromagnet 8 has a coil body 124 which bears a winding 126. Said winding 126 has a wire which can be flowed through by electrical current. The winding 126 is closed off radially to the outside (in relation to the longitudinal axis L) by a magnet housing 128. A magnetic field arises as a result of an electrical energization of the winding 126.

An armature space 130 is provided in the interior of the coil body 124, the armature space 130 in the present case filling approximately ⅔ of the interior space of the coil body 124. Here, the armature space 130 is oriented in the direction of the piston 6. The remaining region of the interior space of the coil body 124 is filled by a magnet core 132 which, as is customary, is composed of magnetically soft material, which guides the magnetic field lines in an effective manner. Merely for reasons of simple illustration, the magnet housing 128 and magnet core 132 are illustrated here in one piece. In the armature space 130, there is situated an armature 12 which, in the exemplary embodiment shown here, is of cylindrical form in sections and of frustoconical form in sections and has a base surface 134 on the frustoconical section. A gap 138 can be formed between the base surface 134 and a terminating surface 136, which faces toward the armature space 130 of the magnet core 132.

When the winding 126 is not electrically energized, a magnet spring 140 pushes the armature 12 to the right (in relation to the plane of the image), such that the gap 138 has its maximum extent. If the winding 126 is electrically energized, it generates a magnetic field which pulls the armature 12 to the left (in relation to the plane of the image) counter to the force of the magnet spring 140, such that the gap 138 is closed or is virtually closed. The armature 12 bears an armature rod 14. Merely for reasons of simple illustration, the armature 12 and armature rod 14 are illustrated here in one piece. Here, the armature rod 14 is oriented concentrically with respect to the armature 12; armature 12 and armature rod 14 are mounted so as to be movable in the longitudinal direction L. The construction can be selected here such that the armature 12 has an axial bore that receives the armature rod 14. Here, the armature rod 14 projects beyond the armature 12 to one side of the latter. A centrally axial bore 122 is provided in the magnet core 132. Fluid can flow into the gap 138 through the bore 122 in order to permit rapid movement of the armature 12. This fluid can also be pushed out through the bore 122. Since the bore 122 does not bear an armature rod, it can be formed with a considerably smaller diameter, as a result of which costs and construction space are saved.

The armature space 130 is delimited on one side by the magnet core 132, wherein, as already described, the magnet core 132 fills that part of the interior space of the coil body 124 which is averted from the piston 6, and said magnet core 132 thus also describes the axial end of the electromagnet 8, but also of the locking unit 2, together with the magnet housing 128. On the other side, facing toward the piston 6, the armature space 130 is delimited by a yoke part 142 which can be formed from a magnetically soft material in order to guide the magnetic field lines in an effective manner. Here, a part of the armature 12 protrudes into the yoke part 142. The yoke part 142 here can be part of the detent unit 120 and/or of the electromagnet 8. The yoke part 142 or a middle piece 44 has a through bore 144 which receives and possibly also bears the armature rod 14.

Part of the detent unit 120 is a metal part 46 or the hollow cylinder section 64 thereof. The metal part 46 also has a cap section 62 which here forms the yoke part 142.

The two sections 62, 64 adjoin in each case one corresponding receiving space in the radial direction R. Here, the cap section 62 or the yoke part 142 delimits the armature space 130 and the hollow cylinder section 64 delimits an interior space 146. The interior space 146 extends here in the longitudinal direction L. The magnet spring 140 is also arranged in the interior space 146, said magnet spring being supported at one end on the cap section 62 or yoke part 142 and at the other end on a control element 148, which is arranged on the end side of the armature rod 14. Here, the control element 148 is arranged in a positionally fixed manner on the armature rod 14 and is arranged so as to be longitudinally displaceable together with it. Merely for reasons of simple illustration, the armature rod 14 and control element 148 are illustrated here in one piece. The control element 148 can have a central axial detent bore into which the armature rod 14 can be inserted. For example, the control element 148 can then be pressed together with the armature rod 14 in a suitable manner and thus held on the latter in a positionally accurate manner. The control element 148 is composed substantially of two different geometric bodies, a cylinder section 150 and a cone section 152, wherein the cone section 152, on its lateral surface, forms a cone surface 154. A lateral surface 156 of the cylinder section 150 of the control element 148 is guided and possibly also mounted on an interior space wall 158 which delimits the interior space 146 in the radial direction R. At that axial end of the control element 148 which faces toward the electromagnet 8, there is situated an annular front face 160 against which the one end of the magnet spring 140 lies and is thus reliably guided and held. The cone surface 154 is situated at that end of the control element 148 which is situated opposite the front face 160.

It is conceivable that other constructions are also possible for the configuration of the control element 148. For example, it is also conceivable that the cone surface is arranged on the control element on the side facing toward the electromagnet 8, and the functioning of the locking unit 2 is then possibly altered. The illustrated locking unit 2 is configured such that, when the electromagnet 8 is electrically deenergized, that is to say when the winding 126 is electrically deenergized, the control element 148 forces the detent elements 10, which in the present case are in the form of balls, radially outward and thus blocks the piston 6 in the longitudinal direction L. Blocking of the movement of the piston 6 may however also take place when the electromagnet 8 is electrically energized. Here, according to the proposal, the situation of the gap 138 is also variable. In the exemplary embodiment shown in FIG. 4, the gap 138 is situated on that side of the armature 12 which is averted from the detent unit 120, that is to say between armature 12 and the magnet core 132. As an alternative to this, it is also possible that the gap is then formed between the armature and the yoke part, that is to say that side of the armature which faces toward the detent unit.

The arrangement of the magnet spring 140 in the interior space 146 is advantageous because, in this way, these elements do not impair the magnetic circuit that is formed in the elements around the armature space 130. Alternatively, an arrangement of the magnet spring in the armature space or else outside the detent unit is also possible in order to form a corresponding force accumulator. In the event of an electrical energization of the winding 126, the gap 138 closes by virtue of the armature 12 being displaced to the left, whereby the armature rod 14 and the control element 148 borne by the armature rod 14 are also displaced to the left, whereby the magnet spring 140 is compressed and thus forms a force accumulator for a resetting movement of the unit composed of armature 12, armature rod 14 and control element 148 upon ending of the electrical energization of the winding 126.

The hollow cylinder section 64 of the metal part 46 bears, at its end or end region 162 averted from the cap section 62 or yoke part 142, the one or more detent elements 10, which in the present case are in the form of balls. The detent elements 10 are provided as balls 10 in a ball cage. The sleeve-like or cylinder-like end region 162 of the hollow cylinder section 64 has detent element bores 164 which in this case are oriented radially (in relation to the longitudinal axis L) and which serve for receiving the detent elements 10 or balls. Depending on the axial position of the control element 148, it is possible that the detent elements 10 or balls can or cannot deflect radially inward.

In the locking unit 2 that is shown, the piston 6 comprises two parts. The piston 6 comprises a piston tube 166, which partially projects out of the opening 108, and the piston thrust piece 168, which is produced separately from said piston tube. Here, the arrangement is selected such that the piston thrust piece 168, in the housing 40, adjoins the inner end of the piston tube 166 and/or can lie against said end. The piston tube 166 is completely hollow on the inside. The piston tube 166 lies with its flange ring 118, which is provided on the end side, against the piston thrust piece 168. The flange ring 118 therefore forms a radially oriented (in relation to the longitudinal axis L) boundary surface of the piston tube 166.

The piston thrust piece 168 has an annular recess 170 on its side facing the flange ring 118. The annular recess 170 corresponds to the flange ring 118, wherein the latter can enter the annular recess 170 and can lie in a floating manner against the piston thrust piece 168. They are therefore pressed against each other only on the basis of the action of force of the applied hydraulic pressure, on the one hand, and/or the force of the piston spring 114, on the other hand.

The piston tube 166 has, adjoining one another in the longitudinal direction L, a tube middle piece 94, a tube middle piece 70, and a punched and rolled section 68. The tube middle pieces 70, 94 are a deep drawn part. The punched and rolled section 68 is a punched and rolled part. It can be seen that the punched and rolled part or the punched and rolled section 68 is arranged outside the housing 40 in each of the two positions S1, S2 of the piston 6.

The tube middle piece 94 forms the flange ring 118 or bears the latter. The first tube middle piece 94 adjoins the second tube middle piece 70 at a narrowing 172 in the form of a shoulder. The diameter of the piston tube 166 is smaller in the region of the second tube middle piece 70 than in the region of the first tube middle piece 94. Said narrowing 172 forms a stop.

The piston 6 or the piston tube 166 thereof is guided in the opening 108. If the piston 6 is displaced to the right, the movement is limited by virtue of the fact that the shoulder-like narrowing 172 lies against the shoulder 116.

In the retracted position S1 shown here, the piston 6 has been pushed into the housing 40, and only the punched and rolled section 68, which forms an end-side connecting region 174 of the piston 6, projects out of the housing 40. Further elements (not shown here) that are moved or held by the piston 6 are connected to the piston 6 for the mechanical adjustment thereof in the connecting region 174. For this purpose, the piston 6 can have, for example, a fastening bolt 176 which runs in the radial direction R, and on which said elements (not shown) of a follow-up mechanism can be mounted.

As already stated, all axial sections of the piston tube 166, that is to say the first tube middle piece 94, the narrowing 172, the second tube middle piece 70, the punched and rolled section 68, and the connecting region 174, are hollow on the inside. It is to be noted that the connecting region 174 has a recess 178 provided in the longitudinal central plane, that is to say is slotted. In order to receive the fastening bolt 176 or similar, two diametrically opposite bores or other through openings 180 are provided in the punched and rolled section 68.

Figure 6:
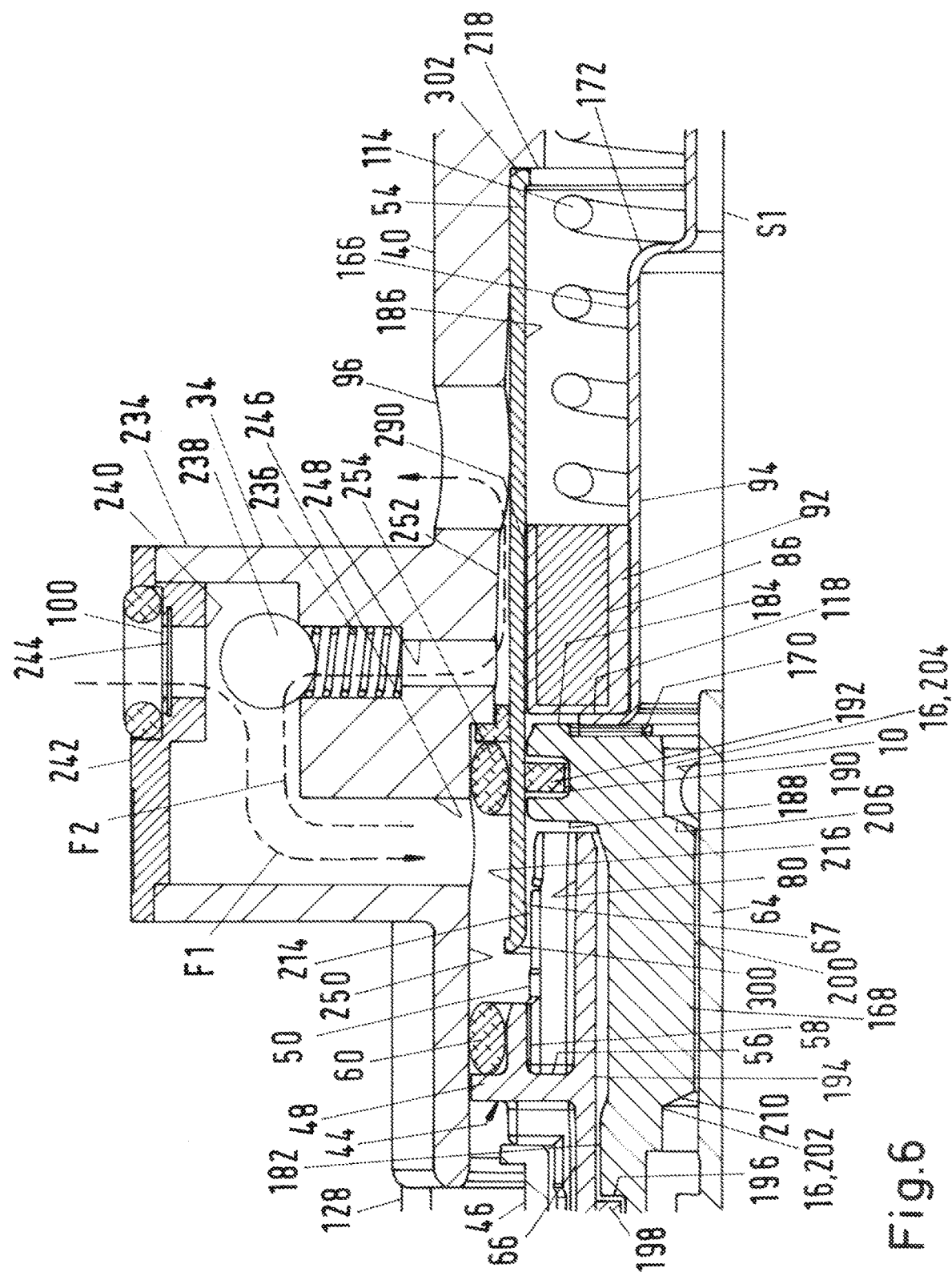
FIG. 6 shows a detail VI according to FIG. 3.

The piston thrust piece 168 is substantially sleeve-like, i.e. hollow radially on the inside, with this and the following details being illustrated in FIG. 6. Its outer surface 182 or an O-ring seal 198 serves for guiding it. At the front end facing toward the piston tube 166, an outer ring 184 is provided on the piston thrust piece 168. The outer surface of said outer ring or an O-ring seal 192 is mounted, or at least guided, on a tube piece inner wall 186. The outer ring 184 can lie in an axial direction (in relation to the longitudinal axis L) against the flange ring 118 of the piston tube 166. A pressure side 188, averted from the flange ring 118, of the piston thrust piece 168 or of the outer ring 184 thereof can be acted on with pressure, such as with hydraulic pressure, and is therefore also of correspondingly solid form.

Here, an annular pressure space 80 is provided. The piston thrust piece 168 can be embodied as a turned part. In some aspects, the piston thrust piece 168 can be formed of tool steel. Radially on the outside, the outer ring 184 has an encircling circumferential groove 190 which receives the O-ring seal 192. Since said O-ring seal 192 is subjected to the hydraulic pressure, it is also pressed in a radial direction and thus reliably closes any remaining gap between the radial outer surface of the outer ring 184 and the tube piece inner wall 186.

Furthermore, a middle piece 44 is provided which is also illustrated, sometimes in more detail, in FIGS. 6 to 9. The middle piece 44 is likewise of sleeve-like form and, at its inner side or at the inner side of the plastics part 48, forms a bearing surface 194 for the piston thrust piece 168. Here, the bearing surface 194 interacts with the lateral surface or outer surface 182 of the piston thrust piece 168 or of the O-ring seal 198 thereof. The middle piece 44 is arranged positionally fixed in the locking unit 2. The plastics part 48 and the metal part 46 are pressed together.

The outer surface 182 here can be the lateral surface of a cylinder or cylinder section. At its end averted from the piston tube 166 and facing toward the electromagnet 8, the outer surface 182 bears the O-ring seal 198 in a circumferential groove 196. Said O-ring seal 198 seals off the gap which remains between the outer surface 182 and the bearing surface 194, and which is under pressure, in the direction of the electromagnet 8. The pressure chamber 80 is therefore sealed in the longitudinal direction L between the O-ring seals 192 and 198.

The piston 6 consists of the two components, the piston tube 166 and the piston thrust piece 168, which are formed in the variant shown here in floating fashion with respect to each other, i.e. are pressed against each other only because of the action of force of the applied pressure, on the one hand, and the counter-directed force of the piston spring 114, on the other hand. Said piston 6 composed of two components is firstly mounted on the bearing surface 194 of the middle piece 44 by way of the piston thrust piece 168. A further mounting is provided at the outer ring 184 of the piston thrust piece 168 in interaction with the tube piece inner wall 186. In addition, the piston tube 166 is mounted on the tube piece inner wall 186 by a plastics carrier 92 and at the opening 108 by the tube middle piece 70.

An inner surface 200 of the piston thrust piece 168 comprises hollows or detent receptacles 202, 204 at each end side, that is to say which are spaced apart from one another axially (in relation to the longitudinal axis L). The diameter of the annular hollows or annular detent receptacles 202, 204 can in this case be larger than the diameter of the inner surface 200 situated between them. The detent receptacles 202, 204 are arranged on the inner surface 200 of the piston thrust piece 168 as a shoulder or internally situated shoulder. The detent unit 120 is arranged in a positionally fixed manner in the housing 40; the piston 6 is configured to be movable longitudinally relative to the detent unit 120. In the retracted position S1 shown in FIGS. 4 and 6, however, the movement of the piston 6 to the right, in the direction of the opening 108, is blocked by the detent unit 120; the locking unit 2 is blocked in the retracted position of the piston 6.

The detent unit 120 comprises detent elements 10, in this case for example balls 10 of a ball cage, which are each mounted in detent element bores 164 so as to be radially movable (with respect to the longitudinal axis L). The electromagnet 8 is shown in a deenergized position, that is to say no electrical current is applied to the winding 126. Therefore, the gap 138 forms between the armature 12 and the magnet core 132, because the magnet spring 140 displaces the armature 12, and thus also the control element 148 on which the magnet spring 140 is supported, to the right. The control element 148 thus moves to the axial position of the detent elements/balls 10, such that the cone surface 154 of the control element 148 acts on the detent elements/balls 10 and pushes these radially outward (in relation to the longitudinal axis L) into the detent receptacle 204. Then, however, a longitudinal movement of the piston 6, that is to say a movement of the piston 6 to the right, is blocked, because a first inner shoulder 206 which delimits the detent receptacle 204 lies against the radially outwardly displaced detent elements 10. The detent elements 10 cannot yield in the longitudinal direction L or circumferential direction U because of the corresponding detent element bores 164 and also cannot dip away in the radial direction R because of the position of the control element 148. The first inner shoulder 206 is in this case situated at the detent receptacle 204 at the side facing toward the detent receptacle 202.

In the retracted position S1, it is furthermore the case that that end of the piston thrust piece 168 which is averted from the piston tube 166 lies against a radially running stop surface 208 of the middle piece 44, and thus also blocks a movement of the piston 6 to the left, in the direction of the electromagnet 8.

For the sake of completeness, reference should also be made at this juncture to FIG. 5 in which the position is shown at which the piston 6 has been extended to the right at a maximum distance from the housing 40, i.e. into the extended position S2. This extended position S2 is on the one hand delimited by the abutment of the narrowing 172 against the shoulder 116 in the region of the opening 108 of the housing 40. In this position, it is in turn the case that the electromagnet 8 is deactivated, that is to say no electrical current is applied to the winding 126, whereby the control element 148 pushes the detent elements/balls 10 into the detent receptacle 202 of the piston thrust piece 168 and thus on the other hand blocks a movement to the left. The radially outwardly pushed detent elements/balls 10 then lie against a second inner shoulder 210, which delimits the detent receptacle 202. The detent receptacle 204 can be a first detent receptacle; the detent receptacle 202 can be a second detent receptacle. The second inner shoulder 210 is in this case situated at that side of the detent receptacle 202 which faces toward the detent receptacle 204. As already described, the two detent receptacles 202 and 204 are spaced apart from one another axially (in relation to the longitudinal axis L).

The piston 6, in particular the piston thrust piece 168, is mounted movably between the hollow cylinder section 64, arranged radially at the inside, and the plastics part 48 of the middle piece 44, arranged radially at the outside. The middle piece 44 assumes a central position in the locking unit 2 in the embodiment shown. On the one hand, it bears the housing 40 on its radial outer side 62 and/or by a sealing ring 60. On the other hand, it however also produces a connection to the electromagnet 8, in particular to the magnet housing 128 thereof.

Furthermore, the middle piece 44 provides for radial alignment of the electromagnet 8 with respect to the detent unit 120. It is expedient to realize a high degree of concentricity in this region.

The middle piece 44 has a connecting region 214 on its side which is averted from the electromagnet 8 or which faces the piston tube 166. Said connecting region 214 is a constituent part of the middle piece 44. Here, the connecting region 214 performs multiple tasks. Firstly, it supports a tube piece 54, which can also be referred to as sleeve piece, which is a part of the housing 40 and which, on its inner side, provides a housing inner wall or a tube piece inner wall 186. Furthermore, at least a part of the connecting region 214 delimits the pressure chamber 80, that is to say is in contact with the pressurizable fluid. For this purpose, the tube piece 54 is pushed or pressed onto the connecting region 214. As already described, the piston 6, in particular the piston thrust piece 168 thereof, lies against the tube piece inner wall 186, and in this respect the tube piece 54 has the characteristics of a cylinder. The tube piece 54 delimits or conducts the fluid or the pressure of the fluid for the adjustment of the piston 6 not only at its tube piece inner wall 186 but also at its tube outer side 216. The tube piece 54 has a rounded inner circumferential edge 300 axially at one end on the inner circumferential side and a rounded outer circumferential edge 302 axially at the other end.

The mounting of the one end of the tube piece 54 on the middle piece 44 emphasizes the central importance of the middle piece 44 in the embodiment shown here. The other end of the tube piece 54 is mounted in the housing 40, and the inner side of the tube piece 54 serves as a mounting or guide of the piston 6. In the present embodiment, the tube piece 54 is, at the right-hand side, connected in fluid-tight fashion to the housing 40 in the region of a projection 218, which can also be referred to as a step.

The locking unit has a piston sensor system and a control element sensor system. The piston sensor system comprises a magnetic element 86 or piston target and two magnetic field sensors 88, 90 or piston sensors. The magnetic element 86 is insert molded by a plastics carrier 92 which is designed as a plastics ring and, on the outer circumferential side, has a supporting surface 290 which can slide along the tube piece inner wall 186 in order to support the piston 6. The plastics carrier 92 is pressed onto the piston 6 and arranged against the flange ring 118 in an axial end region of the piston tube 166. The two magnetic field sensors 88, 90 are each arranged in a fluid opening 96 and can be washed around by fluid. The control element sensor system comprises a magnetic element 292 or control element target and a magnetic field sensor 98 or control element sensor at the housing end 106. The magnetic element 292 is arranged at one end on a connecting rod 298. At the other end, the connecting rod 298 is connected fixedly and therefore longitudinally displaceably to the control element 148.

FIG. 5 shows a perspective sectional view through the locking unit 2 of FIG. 4 in the extended position S2. It can be seen that the piston 6 has been moved out of the housing 40. This extended position S2 is again secured by the detent unit 120, as described. The detent elements 10 have been blanked out in FIG. 5.

FIG. 6 shows a detail VI according to FIG. 3, wherein the nonreturn valve 34 which is configured as a 3/2-way ball nonreturn valve can be seen here. The nonreturn valve 34 replaces the magnetic valve 36 from FIG. 2. It permits a fluid flow into the locking unit 2, this being indicated by fluid path F1. However, it prevents a fluid flow out of the locking unit 2 at this point, as visualized by fluid path F2. This prevents air from being admitted into the hydraulic system and frothing. The open position of the nonreturn valve 34 is shown in FIG. 6. The nonreturn valve 34 comprises a valve housing 234 which is formed integrally with the housing 40 of the locking unit 2. It also comprises a valve closing spring 236 and a ball or closing ball 238 as the closing element. The valve closing spring 236 pretensions the closing ball 238 into a closing position against a sealing seat 240. The closing ball 238 can be guided on its adjustment path between its positions. The sealing seat 240 is formed by a valve cover 242 which forms the valve inlet 100 and has a filter element 244. The valve cover 242 is fixedly connected to the valve housing 234. The valve housing 234 has a first channel 246 which leads from the valve inlet 100 to a pressure-conducting channel 250 in the housing 40. The pressure-conducting channel 250 is formed between the inner wall of the housing 40 and the tube outer side 216. From there, the tube piece 54 is washed around along F1, and the fluid passes into the pressure chamber 80. If the fluid is pushed out of the pressure chamber 80, it follows fluid path F2, with the nonreturn valve 34 then being closed (not illustrated). The fluid path 2 then runs through the first channel 246 into a second channel 248 in which the valve closing spring 236 is also arranged. Via an outlet channel 252 between the inner wall of the housing 40 and the tube outer side 216, the fluid passes out of the housing 40 through a fluid opening 96. A sealing ring 254 separates the pressure-conducting channel 250 and outlet channel 252 fluidically from one another.

Figure 7:
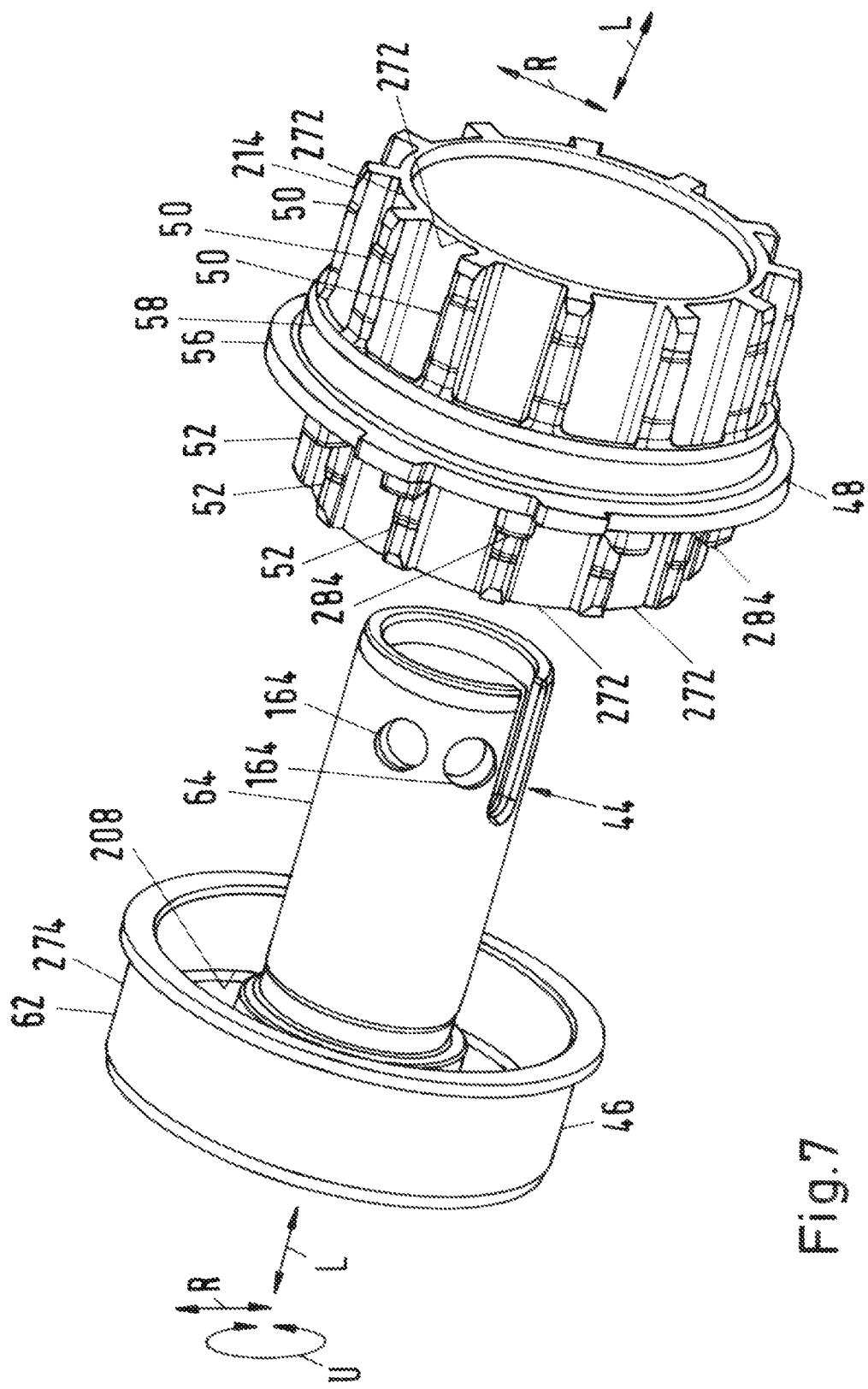
FIG. 7 shows an exploded view of a middle piece.

FIG. 7 shows an exploded view of a middle piece 44.

The two-part design of the middle piece 44 can be clearly seen. The plastics part 48 forms support segments 50, 52 which run in the longitudinal direction L on the outer circumferential side, are equidistant in the circumferential direction U and extend in the radial direction R and bear the tube piece 54 and the metal part 46, as FIGS. 8 and 9 also show. The region between the plastics part 48 and the metal part 46 is a connecting region 286, and the region between the plastics part 48 and the tube piece 54 is likewise a connecting region 288. The connecting regions 286, 288 are each designed as a crown ring. Segment intermediate spaces 272 which run in the longitudinal direction L and are formed between adjacent support segments 50, 52 are formed in each connecting region 286, 288.

Figure 9:
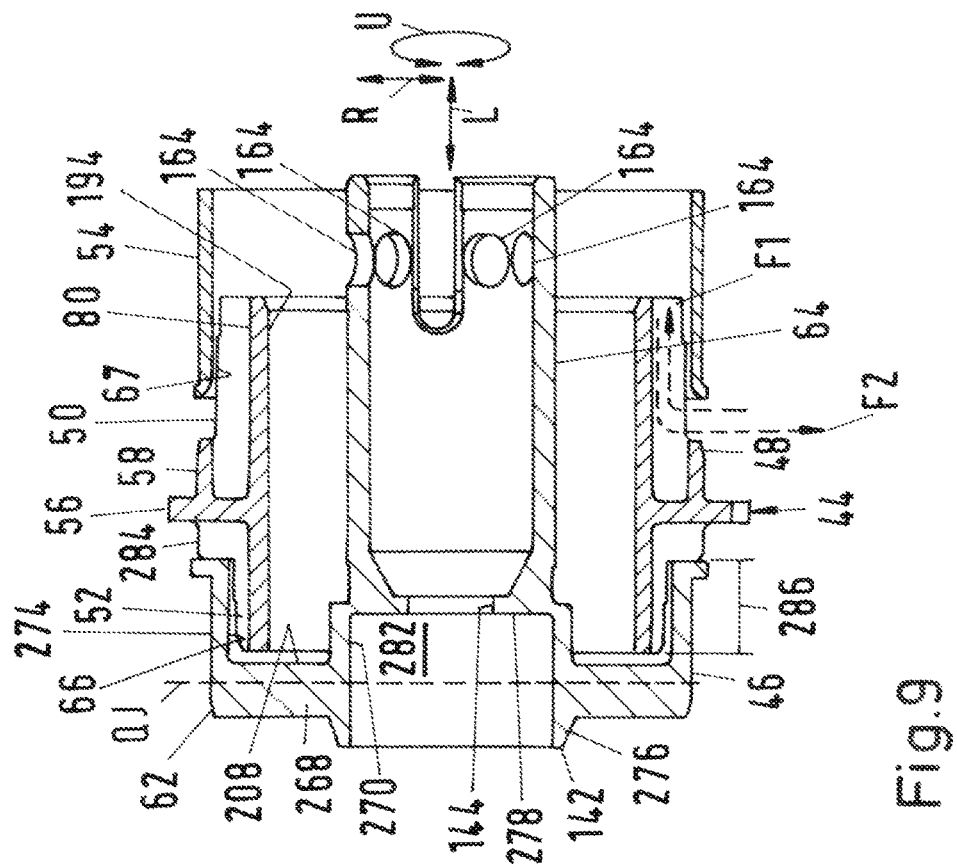
FIG. 9 shows a second sectional view of a middle piece.
Figure 8:
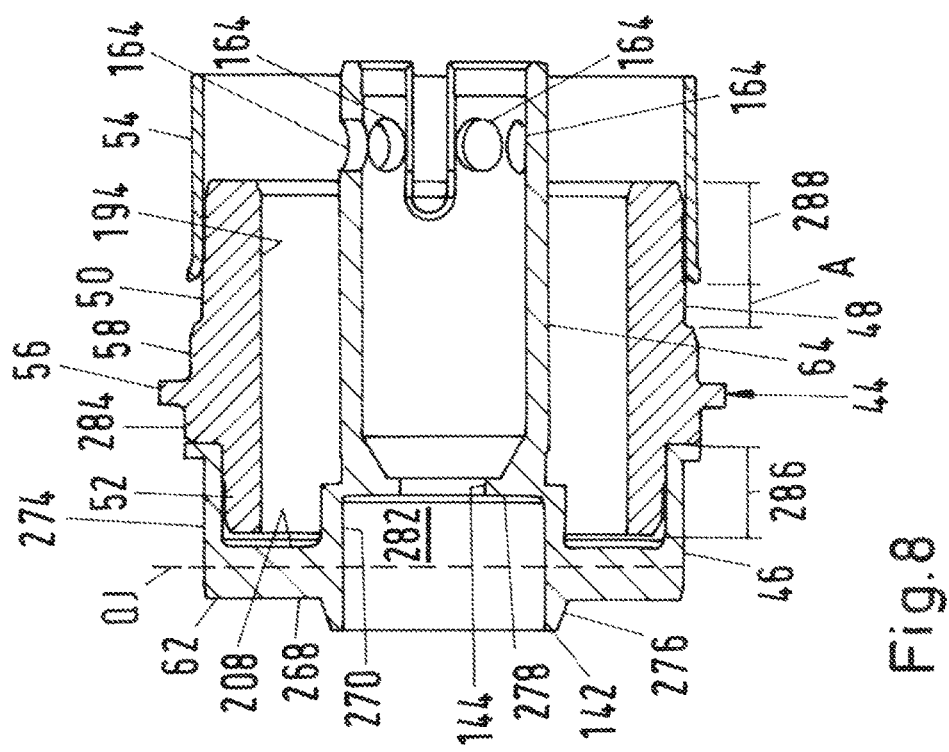
FIG. 8 shows a first sectional view of a middle piece.

FIG. 8 shows a first sectional view of a middle piece 44 through a support segment 50, 52, FIG. 9 likewise showing a sectional view of the middle piece 44, but this time through a segment intermediate space 272.

The metal part 46 has a cap section 62 and a hollow cylinder section 64 extending in the longitudinal direction L. The cap section 62 covers the plastics part 48 on the front face. In addition, the metal part 48 lies against the electromagnet 8 or the coil body 124 thereof. The cap section 62 forms the yoke part 142 which itself is part of the magnetic circuit. The armature space 130 of the electromagnet 8 is simply delimited by the cap section 62 or the yoke part 142, which can be of pot-like configuration. An arrangement can be selected here such that part of the armature 12 can enter the yoke part 142.

The cap section 62 forms a stop surface 208 for the piston thrust piece 168 of the piston 6. The cap section 62 has a front section from which a pot wall section 270 protrudes at a right angle radially on the inner circumferential side and a circumferential wall section 274 protrudes at a right angle radially on the outer circumferential side. On the circumferential side, the pot wall section 270 delimits a pot base section 278 which is connected thereto. The pot wall section 270 and pot base section 278 form a pot-like receiving space 282 for the armature 12. The metal part 46 has a magnetic cone ring 276 protruding in the longitudinal direction L so as to face the electromagnet 8. The front section of the cap section 62 has a material thickness in the longitudinal direction L that is at least twice as large as the material thickness of the adjoining pot wall section 270 in the radial direction R. In addition, a transverse central plane QJ of the yoke part 142 or of the pot-like receiving space 282 extends through the front section.

The hollow cylinder section 64 extends from the pot base section 278. The hollow cylinder section has the detent element bores 164 for receiving the detent elements 10. The hollow cylinder section 64 can therefore form a ball cage. The metal part 46 has, in the pot base section 278, a through bore 144 through which the armature 12 or the armature rod 14 projects and is mounted. It can also be seen that the metal part 46 guides the armature 12 in each of its positions.

The plastics part 48 has, on the outer circumferential side, a supporting flange 56 projecting in the radial direction R. Starting from the supporting flange 56, the support segments 50 extend to one side in the longitudinal direction L and the support segments 52 extend to the other side in the longitudinal direction L. The supporting flange protrudes over the support segments 50, 52 in the radial direction R and centers the middle piece 44 in relation to the housing 40. In addition, the plastics part 48 has, on the outer circumferential side, a carrier flange 58 which projects in the longitudinal direction L and bears a sealing ring 60. The carrier flange 58 is formed integrally with the supporting flange 56 and is supported in the radial direction R on the support segments 50; they fit behind the carrier flange 58.

It can be seen with reference to FIG. 9 that the metal part 46 together with the plastics part 48 forms first channels 66 lying in between them. The first channels 66 lead to a compensating space 280, denoted in FIG. 4. The compensating space 280 can be produced by longitudinal displacement of the piston 6. The first channel 66 is used for pressure compensation. The plastics part 48 together with the tube piece 54 forms second channels 67 lying in between them. The second channels 67 lead to the pressure chamber 80.

The segment intermediate spaces 272 are therefore designed as a fluidic connection. The first and second channels 66, 67 are formed by the plastics part 48 and are separated from one another. A respective channel 66, 67 is therefore formed between support segments 50, 52, which are adjacent in the circumferential direction U, the plastics part 48 radially on the inside and the metal part 46 or the tube piece 54 on the opposite radial side, i.e. radially on the outside.

It can also be seen that the supporting flange 56 separates these two channels 66, 67 fluid-tightly and pressure-tightly, with the supporting flange 56 expediently being configured without apertures in the longitudinal direction L. The support segments 52 each form a longitudinal stop 284 for the metal part 46, with the respective longitudinal stops 284 extending in the radial direction R and protruding over the respective support segment 52 in the radial direction R. A longitudinal distance A, as shown in FIG. 8, is provided between the tube piece 54, on the one hand, and the carrier flange 58, on the other hand.

Figure 10:
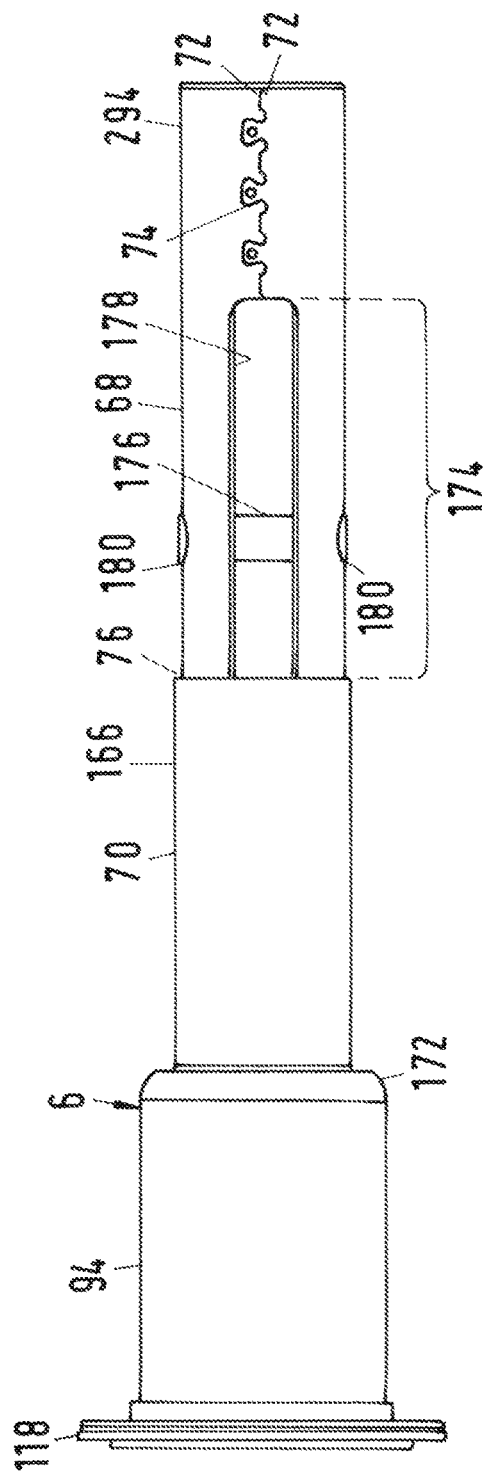
FIG. 10 shows a side view of a piston.

FIG. 10 shows a side view of a piston 6, with the diametrically opposite recesses 178 being seen here. The recesses 178 are designed as elongated holes. Diametrically opposite through openings 180 in which the fastening bolt 176 is held can also be seen. The recesses 178 and the fastening bolt 176 are expediently aligned with one another in the radial direction R. The punched and rolled section 68 is hard brazed or welded to the piston 6 or to a tube middle piece 70 of the piston 6, with a weld seam 76 being shown by way of example. The two interconnected edges 72 of the punched and rolled section 68 form a form fit with each other, the latter being configured here as a puzzle closure 74. The puzzle-shaped edges 72 have form-fitting geometries for this purpose.

Figure 11:
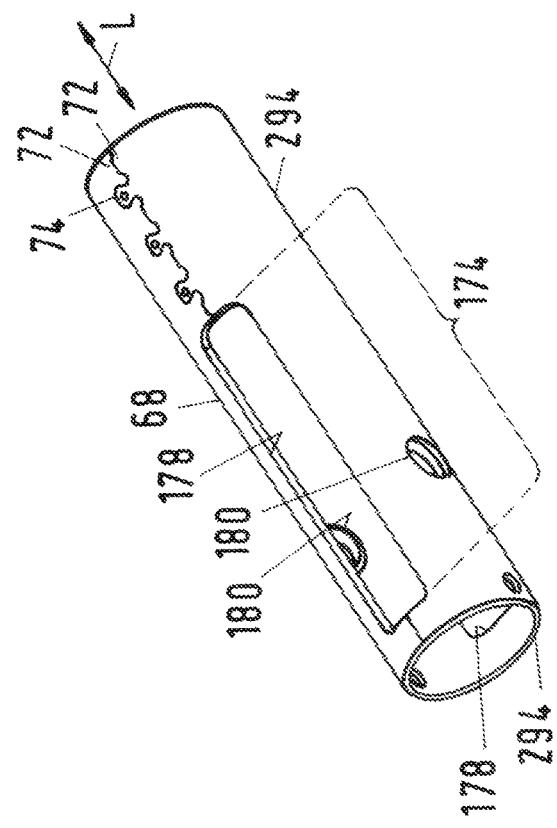
FIG. 11 shows a perspective view of a punched and rolled section of a piston.

FIG. 11 shows a perspective view of a punched and rolled section of a piston 6 from FIG. 10, with it being seen that the recesses 178 are enclosed on both sides in the longitudinal direction L by an annular section 294 of the punched and rolled part or punched and rolled section 68. As a result, a more stable design can be achieved than with an open fork head which has a recess which is open on one side. The punched and rolled part or punched and rolled section 68 is designed as a hollow cylinder with a constant diameter over its longitudinal extent.

Figure 12:
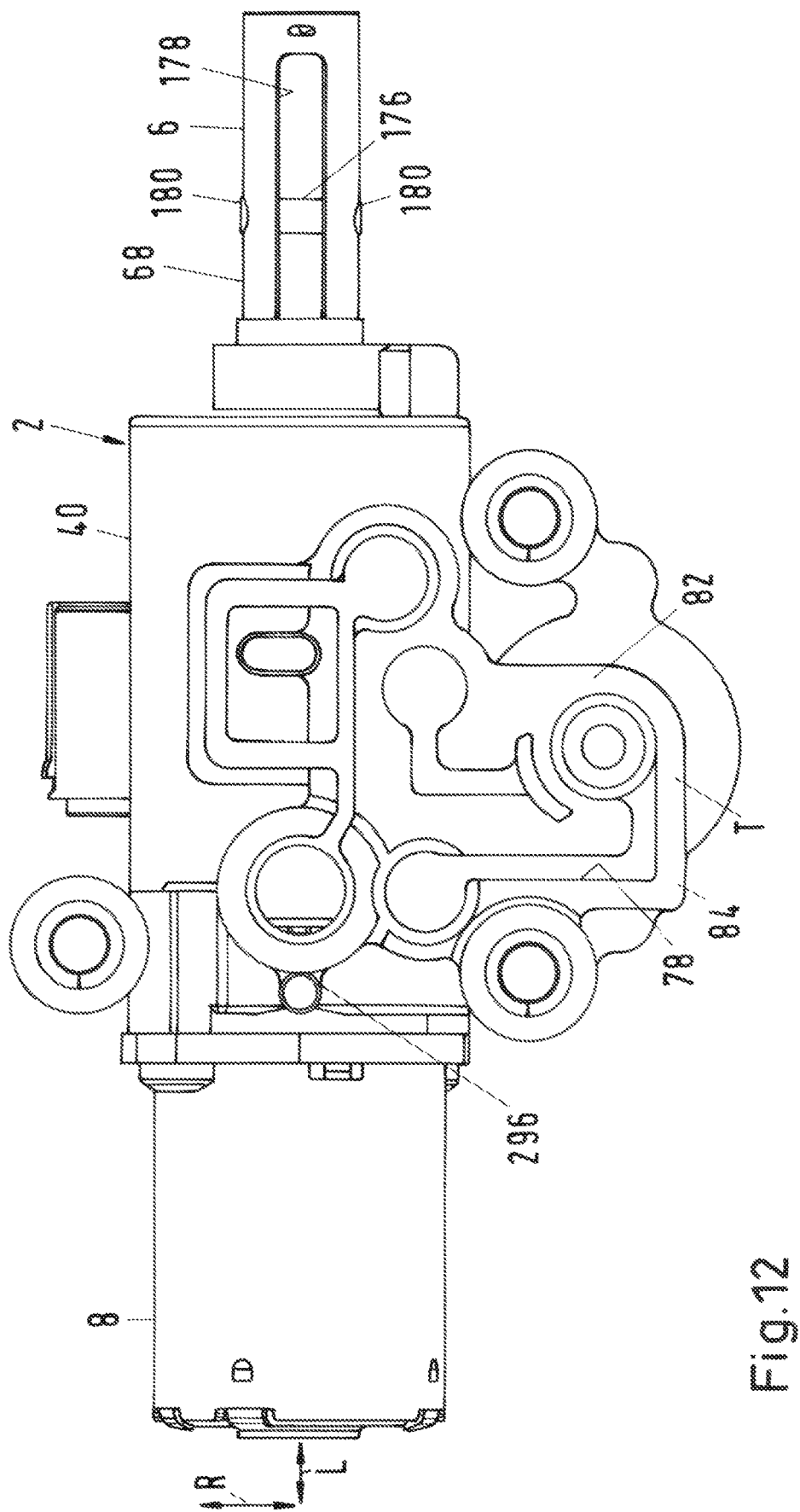
FIG. 12 shows a perspective view of a locking unit.
Figure 13:
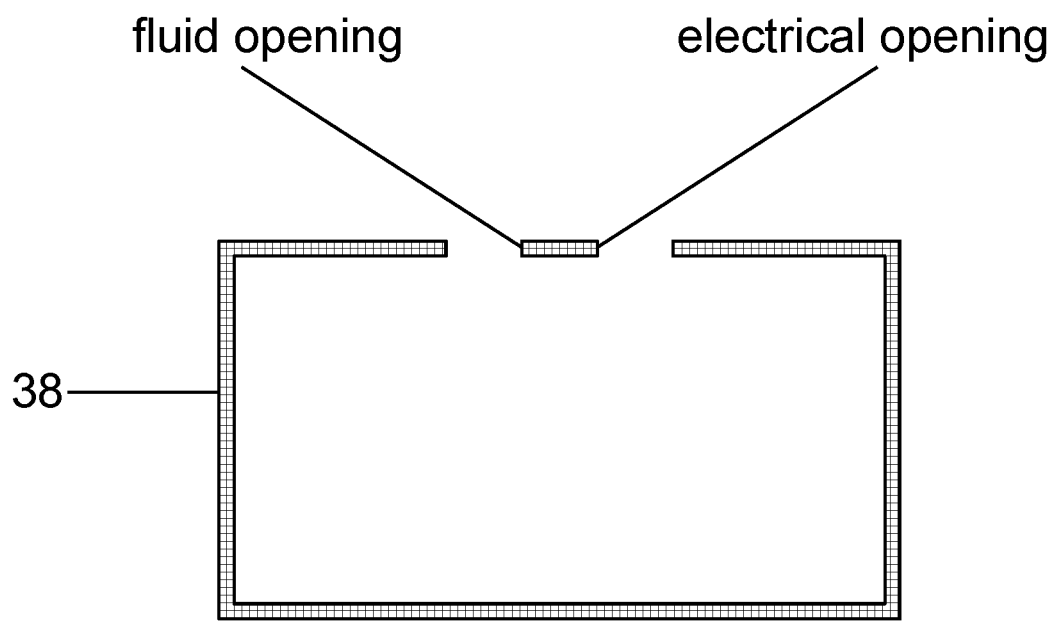
FIG. 13 shows a cross-section view of the housing of the locking arrangement with a fluid opening and a mechanical opening.

FIG. 12 shows a perspective view of a locking unit 2, the housing 40 forming a meandering fluid channel 78. The meandering fluid channel 78 is fluidically connected to the pressure chamber 80 and basically serves for conducting fluid into the locking unit 2. The meandering fluid channel 78 runs along a housing side 82, the housing 40 having a separating plane T in which a meandering seal 84 is arranged. A cover which covers the meandering fluid channel 78 and the meandering seal 84 can be screwed down at bores 296. However, the cover has been blanked out in order to visualize the fluid channel 78. However, it has a fluid opening which leads into the meandering fluid channel 78.

A method for operating the locking arrangement 1 or the locking unit 2 can provide at least the following steps:
    determining that the piston 6 of the locking unit 2 is intended to be adjusted from the retracted position S1 or the extended position S2 into the respective other of the two positions S1, S2 (target position),
    determining in which operating direction the pump 28 of the coolant circuit 30 is operated, wherein
        when a suction mode of the pump 28 is determined, the operating direction of the pump 28 is adjusted into the pressure mode, or
        when a pressure mode of the pump 28 is determined, the operating direction of the pump 28 is retained in the pressure mode,
    pressurizing the piston 6 with a hydraulic fluid conveyed by the pump,
    determining that the piston 6 has reached the target position,
    when the suction mode is determined in b): adjusting the pump 28 again into the suction mode.

The disclosure is not restricted to any one of the above-described embodiments, but may be modified in a variety of ways. All of the features and advantages that emerge from the claims, from the description and from the drawings, including structural details, spatial arrangements and method steps, may be essential both individually and in a wide variety of combinations.

To avoid repetitions, it is the intention that features disclosed in device terms are also disclosed, and capable of being claimed, in method terms. It is likewise the intention that features disclosed in method terms are disclosed, and capable of being claimed, in terms of the device.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A locking arrangement for an electric vehicle, comprising:
    a locking unit;
    an electric motor; and
    an axle which is driveable by the electric motor,
    wherein the locking unit comprises a piston and serves for locking a movement of the piston which can be acted on with pressure of a fluid, wherein the locking unit has an electromagnet and at least one detent element, and the at least one detent element interacts with an armature or an armature rod of the electromagnet, and the piston has at least one detent receptacle, and the piston can be secured by a retaining interaction of the at least one detent element with the at least one detent receptacle, wherein the piston is adjustable between a retracted position and an extended position, wherein the piston acts in the retracted position or the extended position on the axle in such a manner that a rotation of the axle is mechanically blocked.

2. The locking arrangement as claimed in claim 1, further comprising:
    a blocking gear which is connected to a driven shaft of the electric motor or to the axle for conjoint rotation, wherein the piston engages in the retracted position or the extended position in the blocking gear in order to block the rotation of the axle.

3. The locking arrangement as claimed in claim 1, further comprising:
- a gear which is connected to a driven shaft of the electric motor or to the axle for conjoint rotation; and
- a blocking gear configured to engage with the gear, wherein the piston engages in the retracted position or the extended position in the blocking gear in order to block the rotation of the axle.

4. The locking arrangement as claimed in claim 1, further comprising:
- a coolant circuit comprising a pump and a line, wherein the line extends between the pump and the locking unit.

5. The locking arrangement as claimed in claim 4, wherein the line is free from a valve, or wherein the locking unit is free from the valve.

6. The locking arrangement as claimed in claim 1, wherein the locking unit has a nonreturn valve or a solenoid valve which permits a fluid flow into the locking unit.

7. The locking arrangement as claimed in claim 6, wherein the nonreturn valve or the solenoid valve is formed integrally with a housing of the locking unit.

8. The locking arrangement as claimed in claim 1, further comprising:
- an outer housing in which the locking unit is arranged.

9. The locking arrangement as claimed in claim 8, wherein the outer housing has three openings or interfaces.

10. The locking arrangement as claimed in claim 9, wherein the three openings or interfaces comprise a fluid opening, an electrical opening and a mechanical opening.

11. A locking unit for locking a movement of a piston which can be acted on with pressure of a fluid, comprising:
- the piston;
- an electromagnet;
- at least one detent element; and
- a nonreturn valve which permits a fluid flow into the locking unit,
- wherein the at least one detent element interacts with an armature or an armature rod of the electromagnet, and the piston has at least one detent receptacle, and the piston can be secured by a retaining interaction of the at least one detent element with the at least one detent receptacle, wherein the piston is adjustable between a retracted position and an extended position.

12. A method for operating a locking arrangement, wherein the locking arrangement comprises:
- a locking unit;
- an electric motor; and
- an axle which is driveable by the electric motor,
- wherein the locking unit comprises a piston and serves for locking a movement of the piston which can be acted on with pressure of a fluid, wherein the locking unit has an electromagnet and at least one detent element and the at least one detent element interacts with an armature or an armature rod of the electromagnet, and the piston has at least one detent receptacle, and the piston can be secured by a retaining interaction of the at least one detent element with the at least one detent receptacle, wherein the piston is adjustable between a retracted position and an extended position, wherein the piston acts in the retracted position or the extended position on the axle in such a manner that a rotation of the axle is mechanically blocked,
- wherein the method comprises:
  - determining that the piston is intended to be adjusted from the retracted position or the extended position into a respective other of the retracted position and the extended position which defines a target position;
  - determining in which operating direction a pump is operated, wherein:
    - when a suction mode of the pump is determined, the operating direction of the pump is adjusted into a pressure mode, or
    - when a pressure mode of the pump is determined, the operating direction of the pump is retained in the pressure mode;
  - pressurizing the piston with a hydraulic fluid conveyed by the pump; and
  - determining that the piston has reached the target position;
  - when the suction mode is determined, adjusting the pump again into the suction mode.

13. A method for operating a locking unit, wherein the locking unit comprises:
- a piston;
- an electromagnet;
- at least one detent element; and
- a nonreturn valve which permits a fluid flow into the locking unit,
- wherein the at least one detent element interacts with an armature or an armature rod of the electromagnet, and the piston has at least one detent receptacle, and the piston can be secured by a retaining interaction of the at least one detent element with the at least one detent receptacle, wherein the piston is adjustable between a retracted position and an extended position,
- wherein the method comprises:
  - determining that the piston is intended to be adjusted from the retracted position or the extended position into a respective other of the retracted position and the extended position which defines a target position;
  - determining in which operating direction a pump is operated, wherein:
    - when a suction mode of the pump is determined, the operating direction of the pump is adjusted into a pressure mode, or
    - when a pressure mode of the pump is determined, the operating direction of the pump is retained in the pressure mode;
  - pressurizing the piston with a hydraulic fluid conveyed by the pump; and
  - determining that the piston has reached the target position;
  - when the suction mode is determined, adjusting the pump again into the suction mode.

* * * * *